United States Patent
Takahashi

(10) Patent No.: US 11,973,853 B2
(45) Date of Patent: Apr. 30, 2024

(54) RECEIVING APPARATUS AND DATA DECOMPRESSION METHOD

(71) Applicant: SONY SEMICONDUCTOR SOLUTIONS CORPORATION, Kanagawa (JP)

(72) Inventor: Kazuyuki Takahashi, Kanagawa (JP)

(73) Assignee: SONY SEMICONDUCTOR SOLUTIONS CORPORATION, Tokyo (JP)

( * ) Notice: Subject to any disclaimer, the term of this patent is extended or adjusted under 35 U.S.C. 154(b) by 102 days.

(21) Appl. No.: 17/630,610

(22) PCT Filed: May 11, 2020

(86) PCT No.: PCT/JP2020/018820
§ 371 (c)(1),
(2) Date: Jan. 27, 2022

(87) PCT Pub. No.: WO2021/029116
PCT Pub. Date: Feb. 18, 2021

(65) Prior Publication Data
US 2022/0256015 A1   Aug. 11, 2022

(30) Foreign Application Priority Data
Aug. 9, 2019  (JP) .............................. 2019-146961

(51) Int. Cl.
*H04L 69/04* (2022.01)
*H04H 40/27* (2008.01)
*H04L 69/22* (2022.01)

(52) U.S. Cl.
CPC .............. *H04L 69/22* (2013.01); *H04L 69/04* (2013.01)

(58) Field of Classification Search
None
See application file for complete search history.

(56) References Cited

U.S. PATENT DOCUMENTS

2017/0126854 A1*  5/2017  Mosko ................... H04L 69/22
2017/0279865 A1*  9/2017  Iguchi ................ H04B 7/18526
(Continued)

FOREIGN PATENT DOCUMENTS

CA       3041846 A1    5/2018
CN    107005732 A      7/2010
(Continued)

OTHER PUBLICATIONS

International Search Report and Written Opinion of PCT Application No. PCT/JP2020/018820, dated Jul. 21, 2020, 11 pages of ISRWO.
(Continued)

*Primary Examiner* — Duc T Duong
(74) *Attorney, Agent, or Firm* — CHIP LAW GROUP

(57) ABSTRACT

A receiving apparatus includes a packet type determination unit that determines whether or not a TLV packet includes a compressed IP packet, a context information determination unit that determines a context identifier and a context identification header type of the TLV packet determined to include the compressed IP packet, a CID-header storage unit that stores a source IP address assigned to the context identifier, a fixed header information storage unit that stores fixed header information in conformance with an operation specification of a broadcast wave, and a header restoring unit that generates a restored IP packet by decompressing the compressed data in accordance with the TLV packet determined to include the compressed IP packet, the source IP address acquired from the CID-header information storage unit on the basis of the context identifier, and the fixed header information acquired from the fixed header information storage unit.

12 Claims, 12 Drawing Sheets

(56) References Cited

U.S. PATENT DOCUMENTS

| | | | | |
|---|---|---|---|---|
| 2019/0200055 A1* | 6/2019 | Ebata | ............... | H04N 21/4343 |
| 2020/0186870 A1* | 6/2020 | Uchimura | ........... | H04N 21/4348 |
| 2020/0296474 A1* | 9/2020 | Iguchi | ................ | H04N 21/2381 |

FOREIGN PATENT DOCUMENTS

| | | |
|---|---|---|
| EP | 3232671 A1 | 10/2017 |
| JP | 2010-147802 A | 7/2010 |
| JP | 2016-116213 A | 6/2016 |
| KR | 10-2019-0076970 A | 7/2019 |
| WO | 2018/088220 A1 | 5/2018 |

OTHER PUBLICATIONS

"Construction and delivery procedures, etc. of related information based on the provisions of the standard method article 3, paragraph 2, item 2, etc. of transmission related to digital broadcasting of standard television broadcasting, etc., Appendix No. 10, Transmission procedure of compressed IP packet", Ministry of Internal Affairs and Communications Notification No. 233, Jul. 3, 2014, p. 1.

* cited by examiner

FIG. 6
| VALUE OF CONTEXT IDENTIFICATION HEADER TYPE | ASSIGNMENT |
|---|---|
| 0x20 | PARTIAL IPv4 HEADER AND PARTIAL UDP HEADER |
| 0x21 | IDENTIFIER OF IPv4 HEADER PORTION |
| 0x60 | PARTIAL IPv6 HEADER AND PARTIAL UDP HEADER |
| 0x61 | NO COMPRESSED HEADER |
| OTHERS | NO DEFINITION |
FIG. 7
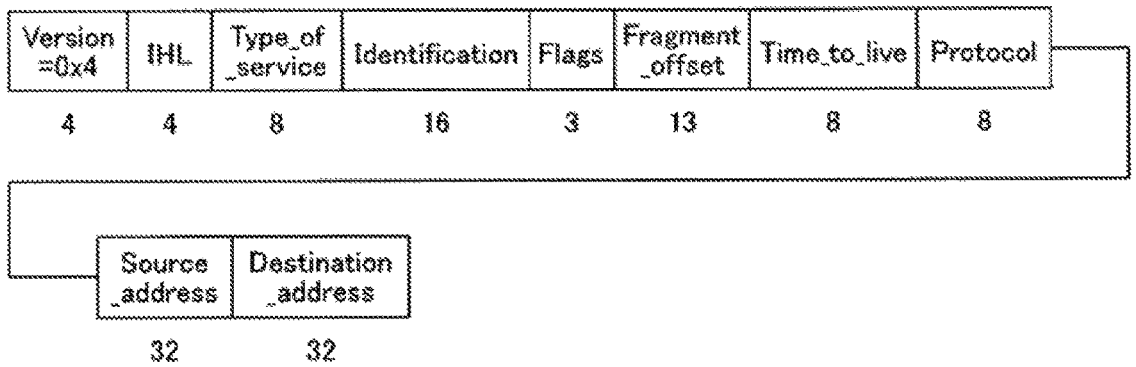
FIG. 8
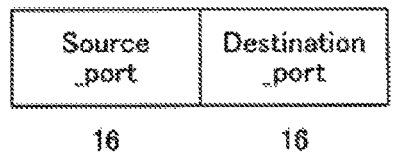

FIG. 9

Structure of IPv6_header_wo_length()

| Version =0x6 | Traffic _class | Flow _label | Next _header | Hop _limit | Source _address | Destination _address |
|---|---|---|---|---|---|---|
| 4 | 8 | 20 | 8 | 8 | 128 | 128 |

FIG. 10

| CID | SOURCE IP ADDRESS 128bit |
|---|---|
| 0 | 2401:dbc0:1000:: |
| 1 | 2401:dbc0:1001:: |
| ... | ... |
| 4095 | 2401:dbc0:1fff:: |

FIG. 11

| CONTEXT IDENTIFICATION HEADER TYPE | version 4bit |
|---|---|
| 0x20 | 0x4 |
| 0x21 | 0x4 |
| 0x60 | 0x6 |
| 0x61 | 0x6 |

FIG. 12

| Traffic_class 8bit | flow_label 20bit | hop_limit 8bit | Destination IP address 128bit | Destination port number 16bit | Source port number 16bit |
|---|---|---|---|---|---|
| '0000 0000' | '0000 0000 0000 0000 0000' | 0x20 | ff3e::a000:1000 | 51216 | 50000 |

RECEIVING APPARATUS AND DATA DECOMPRESSION METHOD

CROSS REFERENCE TO RELATED APPLICATIONS

This application is a U.S. National Phase of International Patent Application No. PCT/JP2020/018820 filed on May 11, 2020, which claims priority benefit of Japanese Patent Application No. JP 2019-146961 filed in the Japan Patent Office on Aug. 09, 2019. Each of the above-referenced applications is hereby incorporated herein by reference in its entirety.

TECHNICAL FIELD

The technology according to the present disclosure (the present technology) relates to a receiving apparatus that receives a header-compressed packet generated by replacing IP header information with a context identifier and restores the received packet to original data, and a data decompression method that decompresses the received packet to restore the decompressed packet to original data.

BACKGROUND

Signal processing techniques used for digital broadcasting or the like include, for example, a technique disclosed in Patent Literature 1. In the technique disclosed in Patent Literature 1, a receiver receives a compressed IP packet whose header information is compressed. Then, a CID record is generated on the basis of the CID and the header information identified from the compressed IP packet, and stored in a table. Additionally, the compressed packet is restored from the CID record stored in the table, and the IP packet is outputted.

CITATION LIST

Patent Literature

[PTL 1] Japanese Unexamined Patent Application Publication No. 2010-147802

SUMMARY OF THE INVENTION

Problems to be Solved by the Invention

Unfortunately, the receiver according to the technique disclosed in Patent Literature 1 restores the header-compressed packet to the IP packet by recording the header information included in a full packet. This configuration requires a memory for recording the header information. Therefore, there is a concern that a large memory capacity is required.

In view of the concern described above, an object of the present technology is to provide a receiving apparatus with a reduced memory capacity, and a data decompression method performed by the receiving apparatus.

Means for Solving the Problem

A receiving apparatus according to one embodiment of the present technology includes a packet type determination unit, a context information determination unit, a CID-header information storage unit, a fixed header information storage unit, and a header restoring unit. The packet type determination unit determines whether or not an input TLV packet superimposed on a broadcast wave includes a compressed IP packet including compressed data. The context information determination unit determines a context identifier included in the compressed IP packet and a context identification header type included in the compressed IP packet for the TLV packet determined to include the compressed IP packet by the packet type determination unit. The CID-header information storage unit stores a source IP address assigned to the context identifier. The fixed header information storage unit stores fixed header information, the fixed header information being a fixed value in conformance with an operation specification of the broadcast wave. The header restoring unit generates a restored IP packet by decompressing the compressed data in accordance with the TLV packet determined to include the compressed IP packet by the packet type determination unit, the source IP address acquired from the CID-header information storage unit on the basis of the context identifier determined by the context information determination unit, and the fixed header information acquired from the fixed header information storage unit.

A data decompression method according to one embodiment of the present technology includes determining whether or not an input TLV packet superimposed on a broadcast wave includes a compressed IP packet including compressed data. The method further includes determining a context identifier included in the compressed IP packet and a context identification header type included in the compressed IP packet for the TLV packet determined to include the compressed IP packet. Additionally, the method includes generating a restored IP packet by decompressing the compressed data in accordance with the TLV packet determined to include the compressed IP packet, a source IP address acquired on the basis of the context identifier determined, and fixed header information being a fixed value in conformance with an operation specification of the broadcast wave.

BRIEF DESCRIPTION OF THE DRAWINGS

FIG. 6 is a diagram illustrating a context identification header type.

FIG. 7 is a diagram illustrating the configuration of a partial IPv4 header.

FIG. 8 is a diagram illustrating the configuration of a UDP header.

FIG. 9 is a diagram illustrating the configuration of a partial IPv6 header.

FIG. 10 is a diagram illustrating the configuration of a CID record of data stored in a CID-header information storage unit.

FIG. 11 is a diagram illustrating the configuration of a version information restoring unit.

FIG. 12 is a diagram illustrating the configuration of a fixed header information storage unit.

MODES FOR CARRYING OUT THE INVENTION

Figure 1:
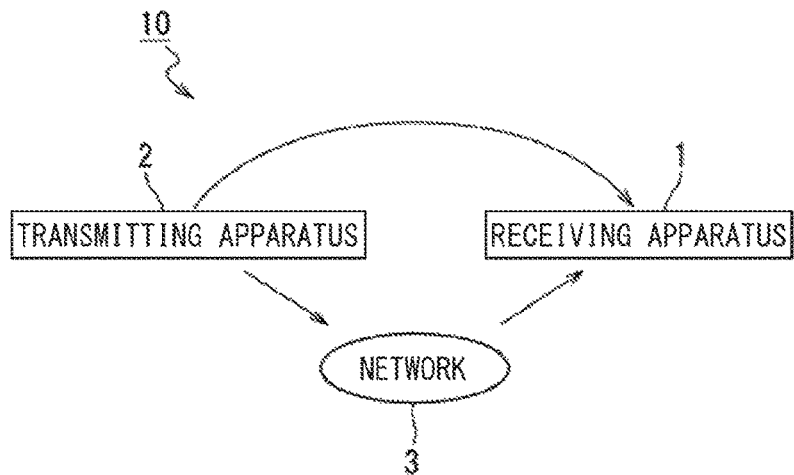
FIG. 1 is a diagram illustrating the configuration of a broadcasting system.

Hereinafter, some embodiments of the present technology will be described with reference to the drawings. In the description of the drawings, the same or similar parts are denoted by the same or similar reference numerals, and redundant description thereof is omitted. Each drawing is schematic and may be different from the actual one. The following embodiments exemplify an apparatus and a method for embodying the technical concept of the present technology, and the technical concept of the present technology is not intended to be limited to the apparatus or the method exemplified in the following embodiments. The technical concept of the present technology may be modified in a variety of ways within the technical scope of the claims.

[First Embodiment]

As illustrated in FIG. 1, a broadcasting system 10 includes a receiving apparatus 1, a transmitting apparatus 2, and a network 3.

The broadcasting system 10 is a system related to digital cable television broadcasting.

The receiving apparatus 1 receives broadcast waves transmitted from the transmitting apparatus 2 via the network 3. It is to be noted that information relevant to the content being broadcasted may be also transmitted via the network 3.

The transmitting apparatus 2 is a device provided in a broadcasting station that performs the digital cable television broadcasting.

<Configuration of Receiving Apparatus>

Figure 2:
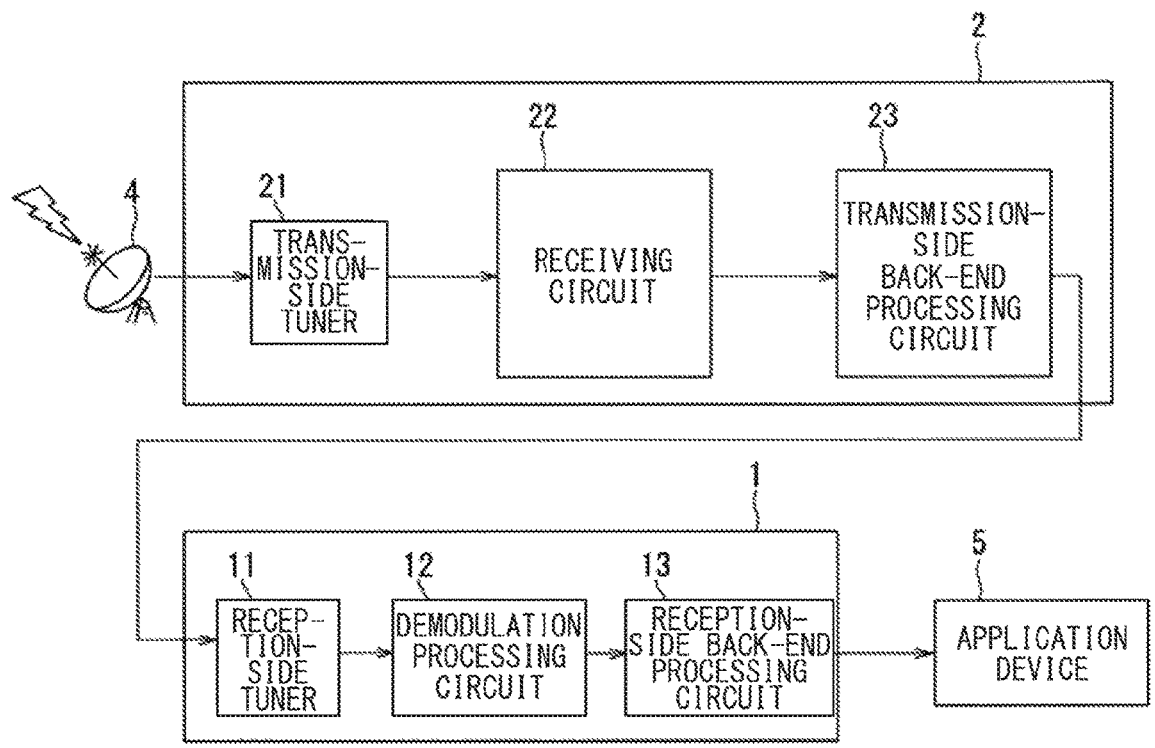
FIG. 2 is a block diagram illustrating the configurations of a transmitting apparatus and a receiving apparatus.

As illustrated in FIG. 2, the receiving apparatus 1 includes a reception-side tuner 11, a demodulation processing circuit 12, and a reception-side back-end processing circuit 13.

The reception-side tuner 11 receives a digital broadcast wave (a divided TLV packet) transmitted from the transmitting apparatus 2 via a cable, and supplies the digital broadcast wave to the demodulation processing circuit 12.

The demodulation processing circuit 12 is an LSI that performs a demodulation process, and is formed of a system-on-a-chip (SOC), for example. The reception-side back-end processing circuit 13 is an LSI that performs a demultiplexing process. The demodulation processing circuit 12 and the reception-side back-end processing circuit 13 may be configured by one LSI or different LSIs. When the demodulation processing circuit 12 and the reception-side back-end processing circuit 13 are configured by different LSIs, the demodulation processing circuit 12 may need to perform a process so as to allow the reception-side back-end processing circuit 13 at the subsequent stage to perform a process. For example, when the demodulation processing circuit 12 and the reception-side back-end processing circuit 13 are configured by different LSIs, the demodulation processing circuit 12 needs to output data so as to satisfy conditions required by the reception-side back-end processing circuit 13.

As described above, the demodulation processing circuit 12 supplies data demodulated so as to satisfy the conditions required by the reception-side back-end processing circuit 13. Note that an example in which the demodulation processing circuit 12 and the reception-side back-end processing circuit 13 are configured by different LSIs is described in the following description.

The demodulation processing circuit 12 generates an IP packet by demodulating an input TLV packet superimposed on the broadcast wave supplied from the reception-side tuner 11. The demodulation processing circuit 12 further supplies the generated IP packet to the reception-side back-end processing circuit 13. Note that the configuration of the demodulation processing circuit 12 will be described in detail later.

The reception-side back-end processing circuit 13 performs a process (a demultiplexing process) of dividing movie content of the IP packet received from demodulation processing circuit 12 into a video portion, an audio portion, and a subtitle portion, for example.

Further, the output signal outputted from the demodulation processing circuit 12 is supplied to the reception-side back-end processing circuit 13. Then, the reception-side back-end processing circuit 13 divides data included in the received signal into video data and audio data, for example. Further, the reception-side back-end processing circuit 13 generates a video or audio signal by performing a process for decoding the video data into a video signal or a process for decoding the audio data into an audio signal, and outputs the video or audio signal to an application device 5 including a display or the like.

The application device 5 is, for example, a tablet terminal or a smartphone. The IP packet may be transmitted to the application device 5 via a wireless LAN or the like, for example.

[Demodulation Processing Circuit]

Figure 3:
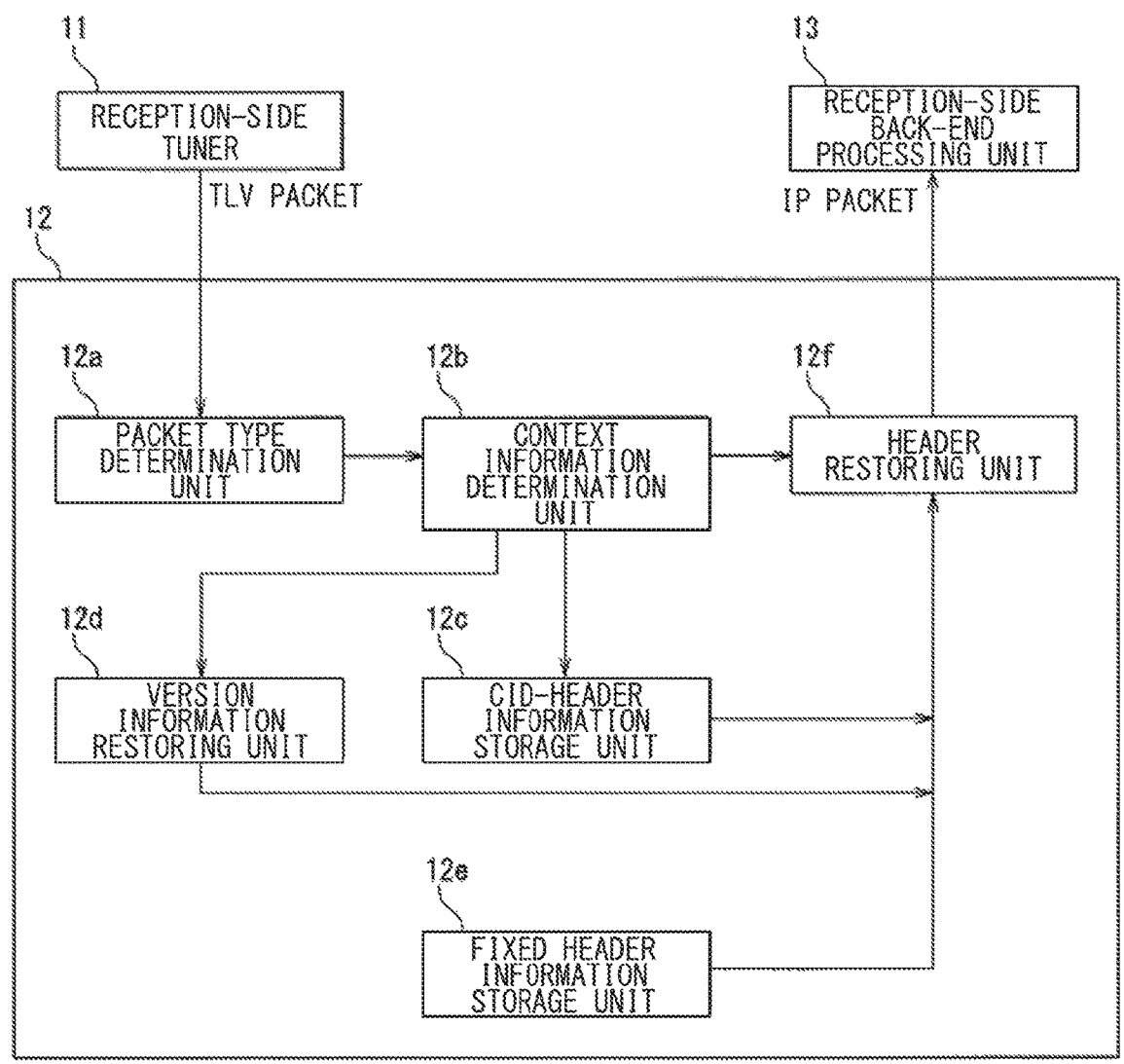
FIG. 3 is a block diagram illustrating the configuration of a demodulation processing circuit.

As illustrated in FIG. 3, the demodulation processing circuit 12 includes a packet type determination unit 12a, a context information determination unit 12b, a CID-header information storage unit 12c, a version information restoring unit 12d, a fixed header information storage unit 12e, and a header restoring unit 12f.

The packet type determination unit 12a determines the type of the input TLV packet superimposed on the broadcast wave transmitted from the transmitting apparatus 2. The packet type determination unit 12a thereby determines whether or not the input TLV packet superimposed on the broadcast wave includes a compressed IP packet whose data is compressed.

Figure 4:
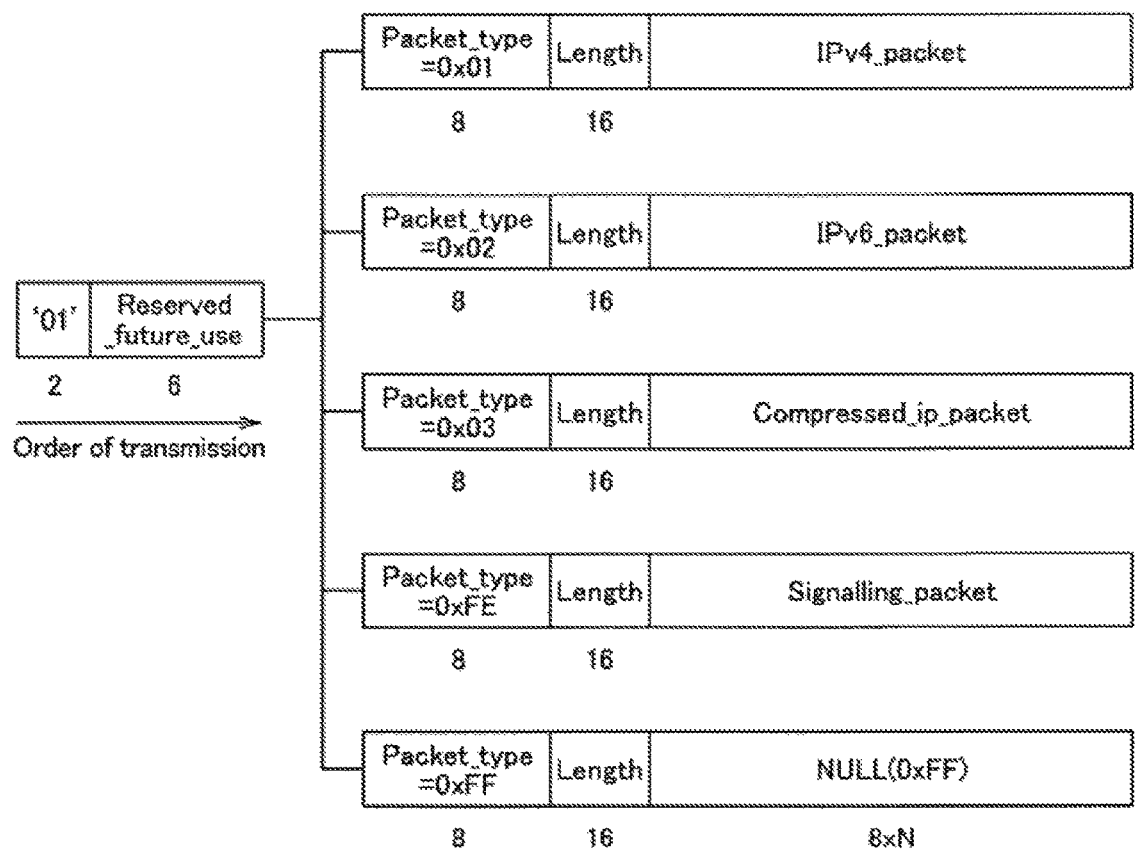
FIG. 4 is a diagram illustrating the configuration of a TLV packet.

As illustrated in FIG. 4, examples of the type of the TLV packet (i.e., packet types illustrated in "Packet_type" regions in FIG. 4) include five types: "0x01", "0x02", "0x03", "0xFE", and "0xFF."

A "01" region in FIG. 4 is a region indicating the eigenvalue of the TLV packet. A "Reserved_future_use" region in FIG. 4 is a region for future expansion. Further, a "Length" region in FIG. 4 is a region indicating the length of data (data length). To the "Length" region, the number of data bits following the data length region is written. A region of data (data region) is a variable length region with the number of data bits of 8×N data bits. Additionally, the data (image, sound, etc.) of digital broadcasting are written to the data region.

A TLV packet of the "0x01" packet type is a TLV packet whose IP header is an IPv4. A TLV packet of the "0x02" packet type is a TLV packet whose IP header is an IPv6 IP. A TLV packet of the "0x03" packet type is a TLV packet including a compressed IP packet. A TLV packet of the "0xFE" packet type is a TLV packet including a transmission control signal packet. A TLV packet of the "0xFF" packet type is a TLV packet including a null packet having a 0xFF byte sequence length indicated in the data length.

For the TLV packet determined to be of the "0x03" packet type by the packet type determination unit 12a, the context information determination unit 12b determines a context identifier included in the compressed IP packet and a context identification header type included in the compressed IP packet.

Figure 5:
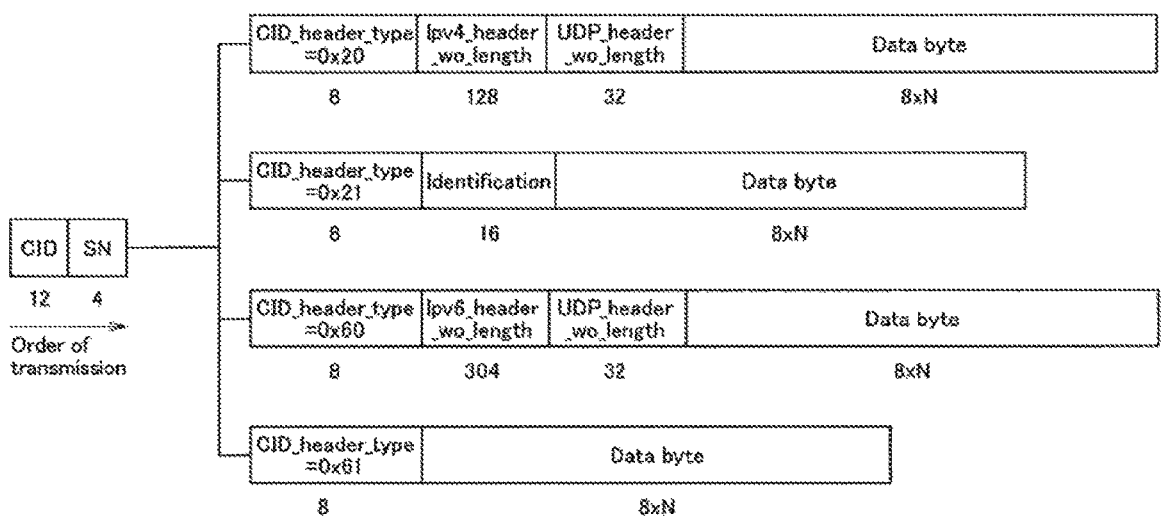
FIG. 5 is a diagram illustrating the configuration of a compressed IP packet.

As illustrated in FIG. 5, the compressed IP packet includes the context identifier (indicated as "CID" in FIG. 5) and the context identification header type (indicated as "CID_header_type" in FIG. 5). Note that a "01" region in FIG. 5 is a region indicating the eigenvalue of the TLV packet.

The context identifier usually varies in 4096 ways, denoted by the numbers "0" through "4095".

As illustrated in FIGS. 5 and 6, the context identification header type includes four types: "0x20", "0x21", "0x60", and "0x61".

The compressed IP packet whose context identification header type is "0x20" is a compressed IP packet to which a partial IPv4 header (see FIG. 7) and a UDP header (see FIG. 8) are assigned. The compressed IP packet whose context identification header type is "0x21" is a compressed IP packet to which the identifier of the partial IPv4 header portion is assigned. The compressed IP packet whose context identification header type is "0x60" is a compressed IP packet to which a partial IPv6 header (see FIG. 9) and a UDP header are assigned. The compressed IP packet whose context identification header type is "0x61" is a compressed IP packet including no compressed header.

Note that each number described outside the frames in FIGS. 4, 5, 7, and 9, indicates the number of bits of data.

As illustrated in FIG. 10, the CID-header information storage unit 12c stores a source IP address assigned in advance to the context identifier (indicated as "CID" in FIG. 10).

As illustrated in FIG. 11, the version information restoring unit 12d restores the version of the TLV packet in accordance with the context identification header type determined by the context information determination unit 12b.

Specifically, as illustrated in FIG. 11, when the context identification header type is "0x20" or "0x21", the version of the TLV packet is restored to "0x4". Note that "0x4" indicates the version "IPv4". That is, when the context identification header type is "0x20" or "0x21", the version information restoring unit 12d restores the version of the TLV packet to the version "IPv4".

On the other hand, when the context identification header type is "0x60" or "0x61", the version of the TLV packet is restored to "0x6". Note that "0x6" indicates the version "IPv6". That is, when the context identification header type is "0x60" or "0x61", the version information restoring unit 12d restores the version of the TLV packet to the version "IPv6".

When the context identification header type determined by the context information determination unit 12b is a type including the UDP header, the version information restoring unit 12d restores the version of the TLV packet by writing the version information to a memory area corresponding to the context identifier included in the compressed IP packet.

Further, when the context identification header type determined by the context information determination unit 12b is a type that includes no UDP header, the version information restoring unit 12d restores the version of the TLV packet by reading the version information from the memory area corresponding to the context identifier included in the compressed IP packet.

The fixed header information storage unit 12e stores fixed header information. The fixed header information is a fixed value in conformance with operation specifications of the broadcast wave.

As illustrated in FIG. 12, the fixed header information includes data such as "Traffic_class", "frow_label", "hop_limit", "Destination IP address", "Destination port number", and "Source port number". Further, although not illustrated, the fixed header information includes, for example, data indicating the following header ("Next_header").

In a first embodiment, an example is described in which the fixed header information includes no information indicating the version of the TLV packet ("Version"). That is, in the first embodiment, the fixed header information stored in the fixed header information storage unit 12e is information excluding the version of the TLV packet.

The header restoring unit 12f generates a restored IP packet by decompressing the compressed data in accordance with the TLV packet determined to include the compressed IP packet by the packet type determination unit 12a, the source IP address acquired from the CID-header information storage unit 12c on the basis of the context identifier determined by the context information determination unit 12b, the version restored by the version information restoring unit 12d, and the fixed header information acquired from the fixed header information storage unit 12e.

Specifically, when the compressed IP packet is a full header packet, the context identifier, the SN, and the context identification header information are removed from the header information of the full header packet.

Further, when the version is IPv4, the header restoring unit 12f calculates the packet length and header checksum in the IP header on the basis of the length calculated from the data length region of the TLV packet. On the other hand, when the version is IPv6, the header restoring unit 12f calculates a payload length, and the data length and checksum in the UDP header.

When the version is IPv4, the header restoring unit 12f adds the calculated packet length and the header checksum to IPv4_header_wo_length, which is the partial IPv4 header. On the other hand, when the version is IPv6, the header restoring unit 12f adds the calculated payload length to IPv6_header_wo_length, which is the partial IPv6 header, to restore the IP header. Additionally, the header restoring unit 12f adds the calculated data length and checksum to UDP-_header_wo_length to restore the UDP-header. The header restoring unit 12f then generates an IP packet using the restored IP header and UDP header as IP header information.

Meanwhile, when the compressed IP packet is determined to be a compressed header packet, the header restoring unit 12f extracts the context identifier from the header information of the compressed header packet. The header restoring unit 12f then acquire the source IP address corresponding to the context identifier from the CID-header information storage unit 12c in accordance with the context identifier.

Further, the header restoring unit 12f acquires the partial IPv4, the partial IPv6 header, and the partial UDP header in accordance with the version restored by the version information restoring unit 12d. Then, the header restoring unit 12f generates an IP packet by calculating the data length or the like, decompressing the data compressed into the compressed IP packet, and restoring the data to the IP header and the UDP header.

Additionally, the header restoring unit 12f transmits the generated IP packet to the reception-side back-end processing circuit 13.

That is, the header restoring unit 12f generates a restored IP packet by decompressing the compressed data in accordance with the TLV packet determined to include the compressed IP packet by the packet type determination unit 12a, the source IP address acquired from the CID-header information storage unit 12c on the basis of the context identifier determined by the context information determination unit 12b, the fixed header information acquired from the fixed header information storage unit 12e, and the version information restored by the version information restoring unit 12d.

Figure 13:
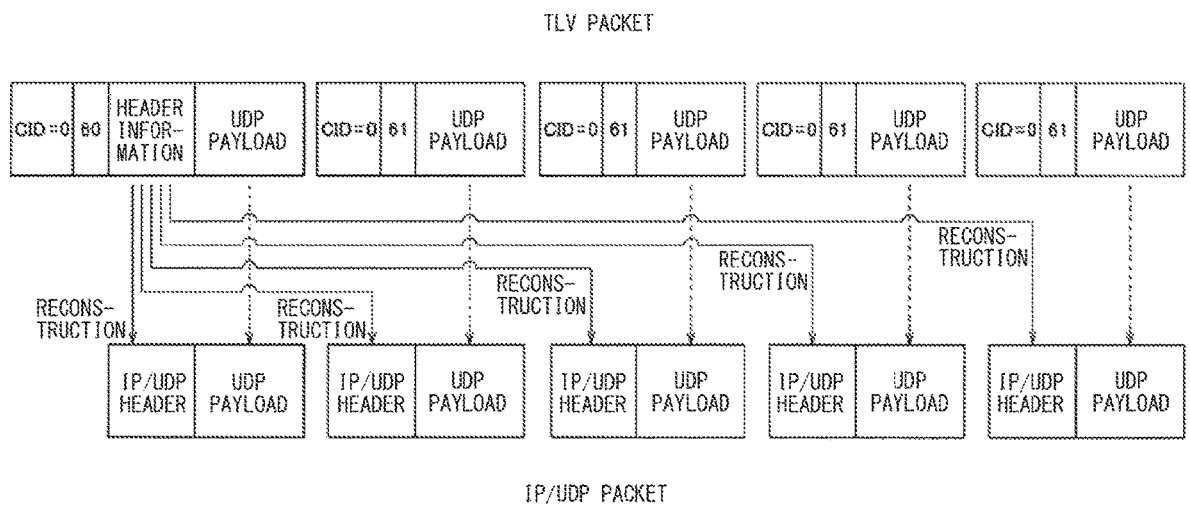
FIG. 13 is a diagram illustrating a process performed by a header restoring unit.

Additionally, as illustrated in FIG. 13, the header restoring unit 12f generates a restored IP packet by decompressing the compressed data in a TLV packet whose context identifier is the same as that of the TLV packet determined to include the compressed IP packet by the packet type determination unit 12a.

Figure 14:
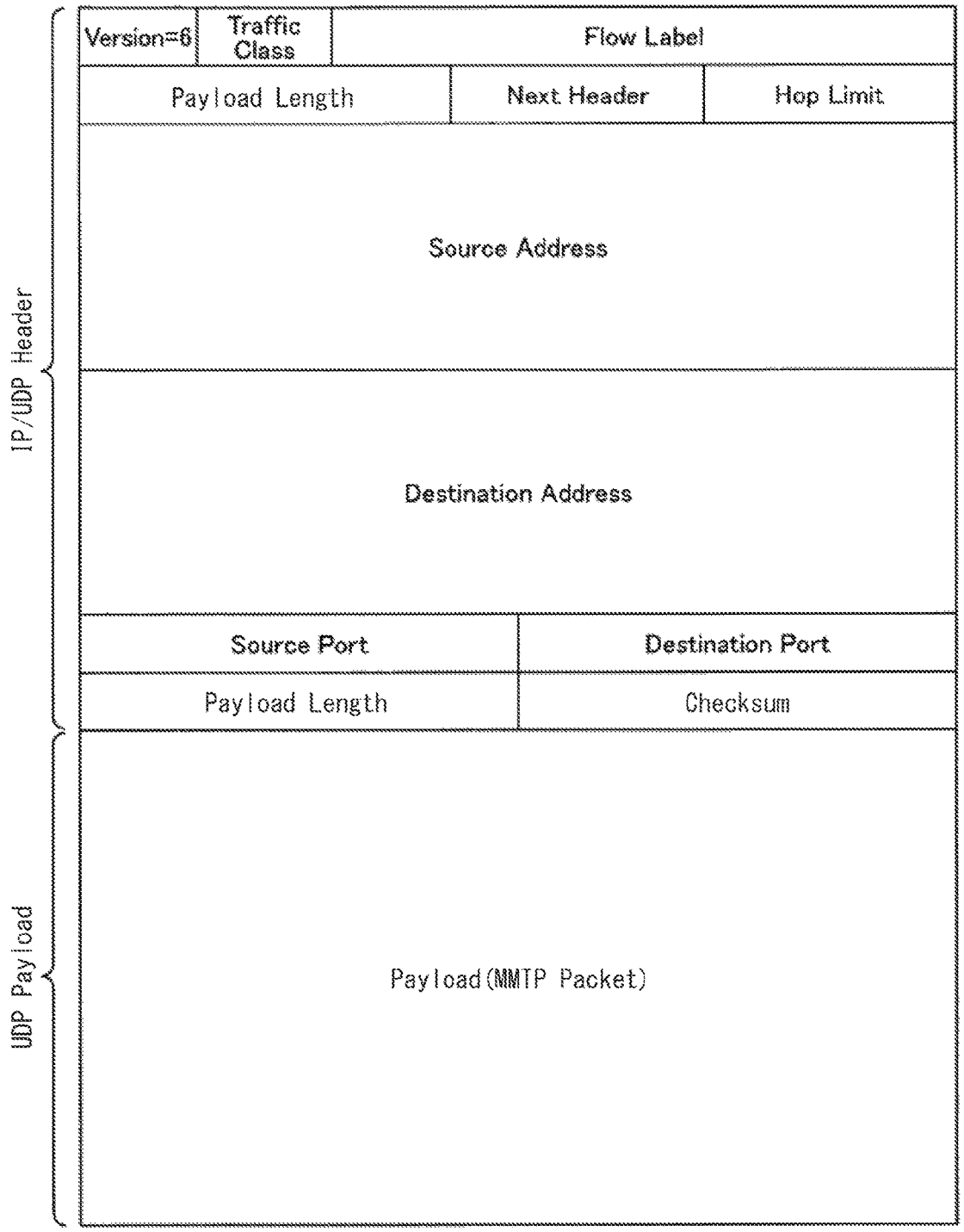
FIG. 14 is a diagram illustrating an IP packet generated by decompressing the compressed IP packet to which the partial IPv6 header and the UDP header are assigned.

In an example illustrated in FIG. 14, the IP packet generated by decompressing the compressed IP packet to which the partial IPv6 header and the UDP header are assigned includes an IP/UDP header and a UDP payload.

The IP/UDP header includes the version of the TLV packet, the fixed header information, and the source IP address.

The UDP payload includes an MMTP packet having a variable length.

<Configuration of Transmitting Apparatus>

As illustrated in FIG. 2, the transmitting apparatus 2 includes a transmission-side tuner 21, a receiving circuit 22, and a transmission-side back-end processing circuit 23. Note that the transmission-side tuner 21 and the receiving circuit 22 may be integrated into an LSI.

To the transmission-side tuner 21, an antenna 4 is connected. The antenna 4 is an antenna for receiving satellite broadcasting.

The receiving circuit 22 supplies a data signal supplied from the transmission-side tuner 21 to the transmission-side back-end processing circuit 23. The data signal supplied from the receiving circuit 22 to the transmission-side back-end processing circuit 23 includes the entirety or a portion of the TLV packet.

The transmission-side back-end processing circuit 23 converts the broadcast wave supplied from the receiving circuit 22 to a broadcast wave for digital cable television broadcasting. Then, the transmission-side back-end processing circuit 23 transmits the converted broadcast wave (digital broadcast wave) to the receiving apparatus 1 via a cable (cable television transmission path). In one example, the digital broadcast wave transmitted from the transmitting apparatus 2 to the receiving apparatus 1 includes two carrier waves modulated by a 256QAM modulation scheme and one carrier wave modulated by a 64QAM modulation scheme, for divisional transmission.

The transmitting apparatus 2 uses the 64QAM modulation scheme and the 256QAM modulation scheme as modulation schemes corresponding to the transmission capacity required for transmitting main signals. Then, the transmitting apparatus 2 generates main signals in units of slots. At this time, the transmitting apparatus 2 modulates the main signal of each slot by the modulation scheme selected for the slot of the main signal. Therefore, the transmitting apparatus 2 converts the TLV packet into divided TLV packets, applies a cable modulation to the divided TLV packets, and transmits the packets to the receiving apparatus 1 via a cable.

Further, as described above, satellite broadcasting is broadcasted in the form of digital broadcast waves of an MMT-TLV scheme. Therefore, the transmitting apparatus 2 converts the digital broadcast waves of the MMT-TLV scheme into the divided TLV packets and transmits the divided TLV packets as the broadcast wave of the digital cable television broadcasting.

<Operation>

Hereinafter, an operation of the receiving apparatus 1 will be described with reference to FIGS. 15 and 16 by referring to FIGS. 1 to 14.

Figure 15:
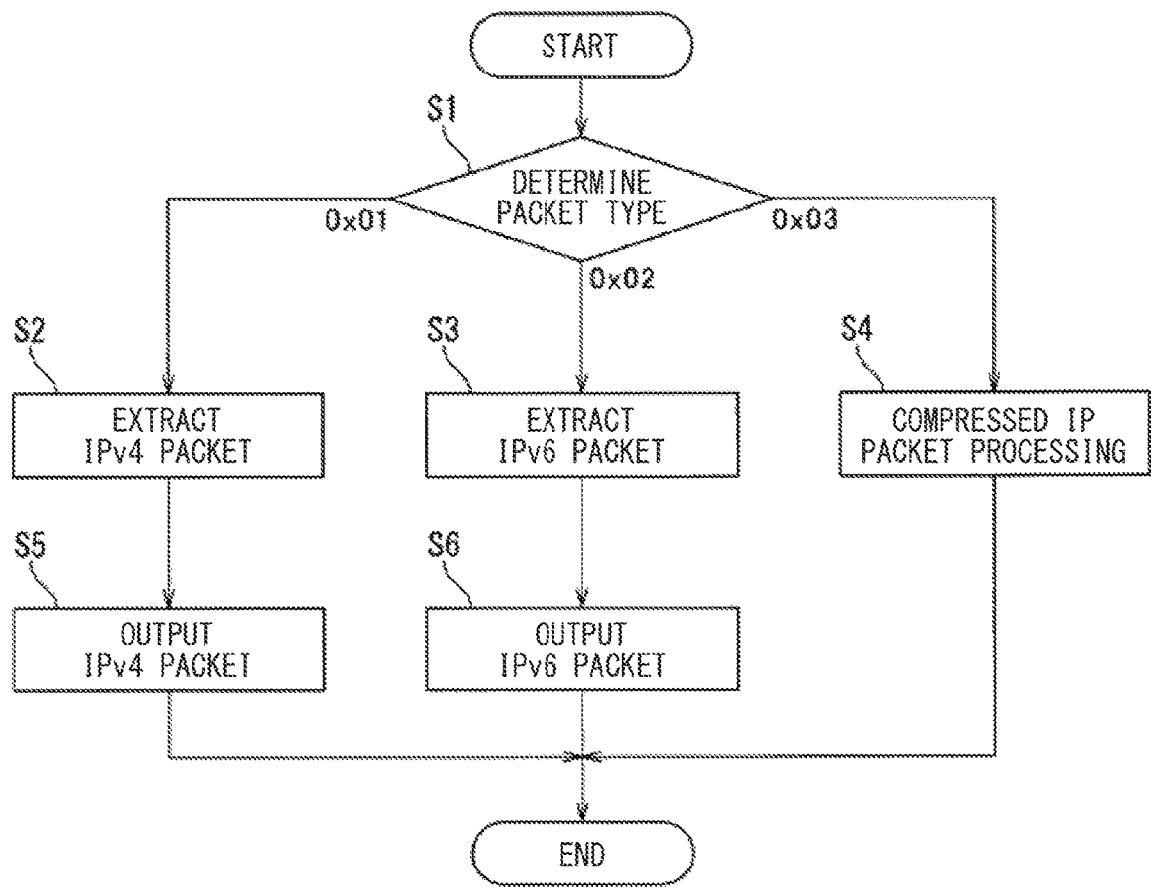
FIG. 15 is a flowchart illustrating an operation of the receiving apparatus.

As illustrated in FIG. 15, the packet type determination unit 12a determines, in Step S1, the type of the input TLV packet superimposed on the broadcast wave transmitted from the transmitting apparatus 2. If the type of the TLV packet is determined to be "0x01" in Step S1, the process proceeds to Step S2. If the type of the TLV packet is determined to be "0x02" in Step S1, the process proceeds to Step S3. If the type of the TLV packet is determined to be "0x03" in Step S1, the process proceed to Step S4.

In Step S2, the header restoring unit 12f extracts the IPv4 packet from the TLV packet, and the process proceeds to Step S5.

In Step S3, the header restoring unit 12f extracts the IPv6 packet from the TLV packet, and the process proceeds to Step S6.

In Step S4, a compressed IP packet processing is performed as a process for decompressing the data compressed in the compressed IP packet and generating a restored IP packet. Note that the compressed IP packet processing will be described in detail later.

In Step S5, the header restoring unit 12f outputs the IPv4 packet as an IP packet, and ends the operation.

In Step S6, the header restoring unit 12f outputs the IPv6 packet as an IP packet, and ends the operation.

Now, details of the compressed IP packet processing are described.

Figure 16:
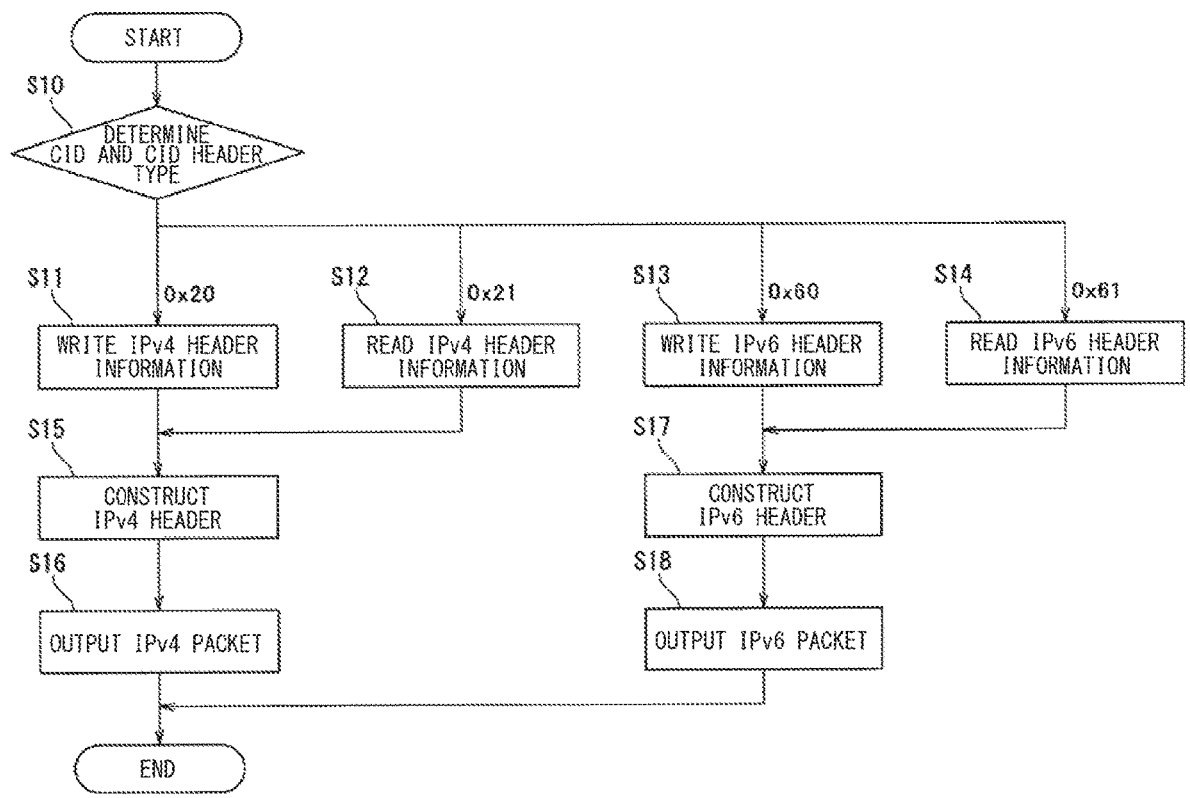
FIG. 16 is a flowchart illustrating an operation of the receiving apparatus.

As illustrated in FIG. 16, in the compressed IP packet processing, the context information determination unit 12b determines, in Step S10, the context identifier (CID) included in the compressed IP packet and the context identification header type (CID header type) included in the compressed IP packet for the TLV packet whose packet type is determined to be "0x03" in Step S1. If the CID header type is determined to be "0x20" in Step S10, the process proceeds to Step S11. If the CID header type is determined to be "0x21" in Step S10, the process proceeds to Step S12. Further, if the CID header type is determined to be "0x60" in Step S10, the process proceeds to Step S13. If the CID header type is determined to be "0x61" in Step S10, the process proceeds to Step S14.

In Step S11, the version information restoring unit 12d writes the header information of the version IPv4 to the memory area corresponding to the context identifier included in the compressed IP packet, and the process proceeds to Step S15.

In Step S12, the version information restoring unit 12d reads the header information of the version IPv4 from the memory area corresponding to the context identifier included in the compressed IP packet, and the process proceeds to Step S15.

In Step S13, the version information restoring unit 12*d* writes the header information of the version IPv6 to the memory area corresponding to the context identifier included in the compressed IP packet, and the process proceeds to Step S17.

In Step S14, the version information restoring unit 12*d* reads the header information of the version IPv6 from the memory area corresponding to the context identifier included in the compressed IP packet, and the process proceeds to step S17.

In Step S15, the header restoring unit 12*f* constructs the IPv4 header on the basis of the header information of the version IPv4 written to the memory area in Step S11 or the header information of the version IPv4 read from the memory area in Step S12, and the process proceeds to Step S16.

In Step S16, the header restoring unit 12*f* outputs the IPv4 packet as an IP packet, and ends the operation.

In Step S17, the header restoring unit 12*f* constructs the IPv6 header on the basis of the header information of the version IPv6 written to the memory area in Step S11 or the header information of the version IPv6 read from the memory area in Step S12, and the process proceeds to step S18.

In Step S18, the header restoring unit 12*f* outputs the IPv6 packet as an IP packet, and ends the operation.

<Data Decompression Method>

In the data decompression method performed using the receiving apparatus 1 of the first embodiment, it is determined whether or not the input TLV packet superimposed on the broadcast wave includes a compressed IP packet including compressed data. Then, if the input TLV packet includes the compressed IP packet, the context identifier included in the compressed IP packet and the context identification header type included in the compressed IP packet are determined. Additionally, the version of the TLV packet is restored in accordance with the determined context identification header type. Further, the IP packet is generated by decompressing the compressed data in accordance with the TLV packet determined to include the compressed IP packet, the source IP address assigned to the context identifier acquired on the basis of the determined context identifier, the fixed header information that is a fixed value in conformance with operation specifications of the broadcast wave, and the restored version.

Further, in the data decompression method performed using the receiving apparatus 1 according to the first embodiment, a restored IP packet is generated by decompressing the compressed data in the TLV packet whose context identifier is the same as that of the TLV packet determined to include the compressed IP packet.

Further, in the data decompression method performed using the receiving apparatus 1 of the first embodiment, the fixed header information is information excluding the version of the TLV packet.

Additionally, in the data decompression method performed using the receiving apparatus 1 according to the first embodiment, if the determined context identification header type is the type including the UDP header, the version of the TLV packet is restored by writing the version information to the memory area corresponding to the context identifier included in the compressed IP packet. On the other hand, if the determined context identification header type is the type including no UDP header, the version of the TLV packet is restored by reading the version information from the memory area corresponding to the context identifier included in the compressed IP packet.

According to an existing technique, all fixed header information (42 bytes) are recorded for 4096 context identifiers. This configuration requires a memory capacity of 172 kilobytes.

In contrast, according to the configuration of the first embodiment, the restored IP packet is generated by decompressing the compressed data in the TLV packet including the compressed IP packet in accordance with the fixed header information, which is a fixed value in conformance with the operation specifications of the broadcast wave, and the source IP address assigned to the context identifier included in the compressed IP packet.

Accordingly, only the source IP address (16 bytes) assigned to the context identifier among the fixed header information is recorded for 4096 context identifiers in the configuration of the first embodiment. This configuration requires a memory capacity of 64 kilobytes.

The configuration according to the first embodiment therefore eliminates the need for recording all the fixed header information to the receiving apparatus 1. Accordingly, it is possible to provide the receiving apparatus 1 with a reduced memory capacity.

Further, the configuration according to the first embodiment eliminates the need for recording all the fixed header information. Accordingly, it is possible to provide the data decompression method that reduces the memory capacity.

<Modification Examples>

(1) In the first embodiment, the restored IP packet is generated by decompressing the compressed data in the TLV packet whose context identifier is the same as that of the TLV packet determined to include the compressed IP packet by the packet type determination unit 12*a*. However, this example is not restrictive. That is, the restored IP packet may be generated by decompressing the compressed data in the TLV packet whose context identifier is different from that of the TLV packet determined to include the compressed IP packet by the packet type determination unit 12*a*. Likewise, in the data decompression method, the restored IP packet may be generated by decompressing the compressed data in a TLV packet whose context identifier is different from that of the TLV packet determined to include the compressed IP packet.

(2) In the configuration according to the first embodiment, the version information restoring unit 12*d* is included. However, this example is not restrictive. In the configuration according to another embodiment, no version information restoring unit 12*d* may be included. In this case, although the amount of data to be stored in the fixed header information storage unit 12*e* increases, it is possible to reduce the amount of data compared with the existing technique, thereby reducing the memory capacity. Likewise, the data decompression method may include no process for restoring the version of the TLV packet in accordance with the determined context identification header type. Even in this configuration, it is possible to reduce the amount of data and reduce the memory capacity, as compared with the existing technique.

(3) In the first embodiment, the broadcasting system 10 is a system related to the digital cable television broadcasting. However, this example is not restrictive. Alternatively, the broadcasting system 10 may be a system related to satellite broadcasting. In this case, the reception-side tuner 11 receives a satellite broadcast wave (TLV packet) transmitted from the transmitting apparatus 2, and supplies the satellite broadcast wave to the demodulation processing circuit 12 for example.

<Description of Computer to which Present Technology is Applied>

Incidentally, the series of processing described above may be executed by hardware or software. When the series of processing is executed by software, a program included in the software is installed from the recording medium to a computer or the like incorporated in a dedicated hardware. Alternatively, the program included in the software may be installed from the recording medium to a general-purpose personal computer or the like capable of executing various functions on the basis of various programs installed.

Figure 17:
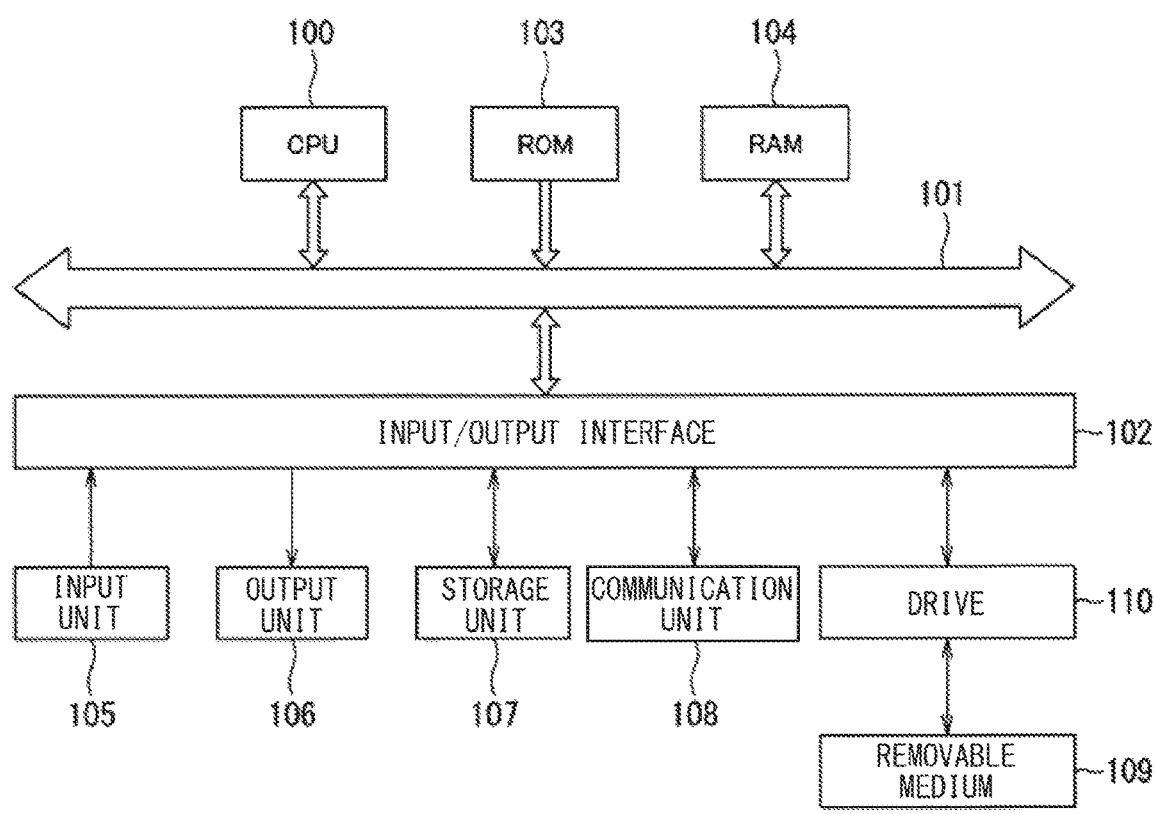
FIG. 17 is a diagram illustrating an example configuration of a personal computer.

FIG. 17 illustrates a configuration example of the general-purpose personal computer. The general-purpose personal computer includes a central processing unit (CPU) 100. To the CPU 100, an input/output interface 102 is coupled via a bus 101. To the bus 101, a read only memory (ROM) 103 and a random access memory (RAM) 104 are coupled.

The input/output interface 102 is coupled to an input unit 105 and an output unit 106. The input unit 105 is formed of input devices, such as a keyboard and a mouse, with which a user inputs an operation command. The output unit 106 outputs an image of a processing operation screen or a processing result to a display device. Additionally, to the input/output interface 102, a storage unit 107 is coupled. The storage unit 107 includes a hard disk drive or the like that stores programs and various data. Further, to the input/output interface 102, a communication unit 108 is coupled. The communication unit 108 includes a local area network (LAN) adapter or the like, and executes a communication process via a network represented by the Internet.

Further, to the input/output interface 102, a magnetic disc (including a flexible disk) and an optical disc (including a compact disc-read only memory (CD-ROM)) or a digital versatile disc (DVD)) are coupled. Further, to the input/output interface 102, a magneto-optical disc (including a mini disc (MD)) or a drive 110 are coupled. The drive 110 reads and writes data form/to a removable medium 109. The removable medium 109 is a semiconductor memory, for example.

The CPU 100 executes various processing in accordance with the program stored in the ROM 103 or the program installed on the storage unit 107 and loaded from the storage unit 107 into the RAM 104. The program installed on the storage unit 107 is read from the magnetic disc, the optical disc, the magneto-optical disc, and the removable medium 109, which is a semiconductor memory, for example.

Further, the RAM 104 also stores data necessary for various processing performed by the CPU 100, as appropriate.

In the computer configured as described above, the CPU 100 loads the program stored in the storage unit 107 into the RAM 104 via the input/output interface 102 and the bus 101, and executes the program, for example. The series of processing described above is thereby performed.

The program executed by the computer (CPU 100) may be recorded on the removable medium 109 serving as, for example, a package medium when provided. The program may also be provided via a wired or wireless transmission medium, such as a local area network, the Internet, or digital satellite broadcasting.

By coupling the removable medium 109 to the drive 110, it is possible for the computer to install a program on the storage unit 107 via the input/output interface 102. Further, the communication unit 108 may receive a program via a wired or wireless transmission medium, and install the program in the storage unit 107. Additionally, a program may be installed on the ROM 103 or the storage unit 107 in advance.

Herein, the processing performed by the computer in accordance with the program are not necessarily performed in the chronological order described in the flowchart. That is, the processing performed by the computer in accordance with the program further includes processing executed in parallel or individually (e.g., parallel processing or object processing).

The program may be processed by a single computer (processor) or may be processed decentrally by a plurality of computers. Further, the program may be transferred to and executed by a remote computer.

Furthermore, the term "system" used herein refers to a set of a plurality of elements (devices, modules (components), etc.), regardless of whether all the elements are in the same case or not. Thus, a plurality of devices accommodated in separate cases and coupled to each other via a network, and a single device including a plurality of modules accommodated in a single case are both systems.

(Other Embodiments)

Although the embodiments of the present technology have been described above, it should not be understood that the description and drawings that form a part of this disclosure are intended to limit the present technology. Various alternative embodiments, working examples, and operational techniques may be apparent from this disclosure to those skilled in the art. Additionally, it is needless to say that the present technology includes various embodiments and the like not described herein, such as a configuration to which each configuration described in the foregoing embodiment is optionally applied. Accordingly, the technical scope of the present technology is determined only by the subject matter of the claims that are reasonable from the above description.

Further, the receiving apparatus and the data decompression method according to the present disclosure do not necessary include all the elements described in the foregoing embodiments or the like, and conversely, may include other elements. It should be noted that the effects described herein are merely illustrative and not restrictive, and other effects may be provided. For example, the present technology may be configured by cloud computing that shares one function among multiple devices and achieves the function by the multiple devices operating in cooperation with each other through a network.

The present technology may have a following configuration.

(1) A receiving apparatus including:
a packet type determination unit that determines whether or not an input TLV packet superimposed on a broadcast wave includes a compressed IP packet including compressed data;
a context information determination unit that determines a context identifier included in the compressed IP packet and a context identification header type included in the compressed IP packet for the TLV packet determined to include the compressed IP packet by the packet type determination unit;
a CID-header information storage unit that stores a source IP address assigned to the context identifier;
a fixed header information storage unit that stores fixed header information, the fixed header information being a fixed value in conformance with an operation specification of the broadcast wave; and a header restoring unit that generates a restored IP packet by decompressing the compressed data in accordance with the TLV packet determined to include the compressed IP packet by the packet type determination unit, the source IP address acquired from the CID-header information storage unit on the basis of the context identifier determined by the context information determination unit, and the fixed header information acquired from the fixed header information storage unit.
(2) The receiving apparatus according to (1) described above, in which
the header restoring unit generates the restored IP packet by decompressing the compressed data in a TLV packet whose context identifier is same as the context identifier of the TLV packet determined to include the compressed IP packet by the packet type determination unit.
(3) The receiving apparatus according to (1) or (2) described above, further including a version information restoring unit that restores a version of the TLV packet in accordance with the context identification header type determined by the context information determination unit, in which
the header restoring unit generates the IP packet in accordance with the TLV packet determined to include the compressed IP packet by the packet type determination unit, the source IP address acquired from the CID-header information storage unit on the basis of the context identifier determined by the context information determination unit, the fixed header information acquired from the fixed header information storage unit, and the version restored by the version information restoring unit.
(4) The receiving apparatus according to (3) described above, in which the fixed header information storage unit stores information excluding the version of the TLV packet as the fixed header information.
(5) The receiving apparatus according to (3) or (4) described above, in which the version information restoring unit restores the version of the TLV packet by writing information regarding the version to a memory area corresponding to the context identifier included in the compressed IP packet when the context identification header type determined by the context information determination unit is a type including a UDP header.
(6) The receiving apparatus according to any one of (3) to (5) described above, in which the version information restoring unit restores the version of the TLV packet by reading information regarding the version from a memory area corresponding to the context identifier included in the compressed IP packet when the context identification header type determined by the context information determination unit is a type including no UDP header.
(7) A data decompression method including:
determining whether or not an input TLV packet superimposed on a broadcast wave includes a compressed IP packet including compressed data;
determining a context identifier included in the compressed IP packet and a context identification header type included in the compressed IP packet for the TLV packet determined to include the compressed IP packet; and
generating a restored IP packet by decompressing the compressed data in accordance with the TLV packet determined to include the compressed IP packet, a source IP address acquired on the basis of the context identifier determined, and fixed header information being a fixed value in conformance with an operation specification of the broadcast wave.
(8) The data decompression method according to (7) described above, in which the restored IP packet is generated by decompressing the compressed data in a TLV packet whose context identifier is same as the context identifier of the TLV packet determined to include the compressed IP packet.
(9) The data decompression method according to (7) or (8) described above, further including:
restoring a version of the TLV packet in accordance with the context identification header type determined; and
generating the IP packet in accordance with the TLV packet determined to include the compressed IP packet, the source IP address acquired on the basis of the context identifier determined, the fixed header information acquired, and the version restored.
(10) The data decompression method according to (9) described above, in which the fixed header information is information excluding the version of the TLV packet.
(11) The data decompression method according to (9) or (10) described above, in which the version of the TLV packet is restored by writing information regarding the version to a memory area corresponding to the context identifier included in the compressed IP packet when the context identification header type determined includes a UDP header.
(12) The data decompression method according to any one of (9) to (11) described above, in which the version of the TLV packet is restored by reading information regarding the version from a memory area corresponding to the context identifier included in the compressed IP packet when the context identification header type determined includes no UDP header.

REFERENCE SIGNS LIST

1 . . . receiving apparatus, 11 . . . reception-side tuner, 12 . . . demodulation processing circuit, 12a . . . packet type determination unit, 12b . . . context information determination unit, 12c . . . CID-header information storage unit, 12d . . . version information restoring unit, 12e . . . fixed header information storage unit, 12f . . . header restoring unit, 13 . . . reception-side back-end processing circuit, 2 . . . transmitting apparatus, 21 . . . transmission-side tuner, 22 . . . receiving circuit, 23 . . . transmission-side back-end processing circuit, 3 . . . network, 4 . . . antenna, 5 . . . application device, 10 . . . broadcasting system, 100 . . . CPU, 101 . . . bus, 102 . . . input/output interface, 103 . . . ROM, 104 . . . RAM, 105 . . . input unit, 106 . . . output unit, 107 . . . storage unit, 108 . . . communication unit, 109 . . . removable medium, 110 . . . drive

The invention claimed is:
1. A receiving apparatus, comprising:
a central processing unit (CPU) configured to:
determine whether an input TLV packet superimposed on a broadcast wave includes a compressed IP packet including compressed data;
determine a context identifier included in the compressed IP packet and a context identification header type included in the compressed IP packet for the input TLV packet determined to include the compressed IP packet;

store a source IP address assigned to the context identifier;

store fixed header information, the fixed header information comprising a fixed value in conformance with an operation specification of the broadcast wave; and generate a restored IP packet by decompressing the compressed data in accordance with the input TLV packet determined to include the compressed IP packet, the source IP address based on the context identifier, and the fixed header information.

2. The receiving apparatus according to claim 1, wherein the CPU is further configured to generate the restored IP packet by decompressing compressed data in a TLV packet whose context identifier is same as the context identifier of the input TLV packet determined to include the compressed IP packet.

3. The receiving apparatus according to claim 1, wherein the CPU is further configured to:

restore a version of the input TLV packet in accordance with the context identification header type; and generate the restored IP packet in accordance with the input TLV packet determined to include the compressed IP packet, the source IP address based on the context identifier, the fixed header information, and the restored version.

4. The receiving apparatus according to claim 3, wherein the CPU is further configured to store information excluding the version of the input TLV packet as the fixed header information.

5. The receiving apparatus according to claim 3, wherein the CPU is further configured to restore the version of the input TLV packet by writing information regarding the version to a memory area corresponding to the context identifier included in the compressed IP packet when the context identification header type is a type including a UDP header.

6. The receiving apparatus according to claim 3, wherein the CPU is further configured to restore the version of the input TLV packet by reading information regarding the version from a memory area corresponding to the context identifier included in the compressed IP packet when the context identification header type is a type including no UDP header.

7. A data decompression method, comprising:

determining whether an input TLV packet superimposed on a broadcast wave includes a compressed IP packet including compressed data;

determining a context identifier included in the compressed IP packet and a context identification header type included in the compressed IP packet for the input TLV packet determined to include the compressed IP packet; and generating a restored IP packet by decompressing the compressed data in accordance with the input TLV packet determined to include the compressed IP packet, a source IP address acquired on a basis of the context identifier determined, and fixed header information comprising a fixed value in conformance with an operation specification of the broadcast wave.

8. The data decompression method according to claim 7, wherein the restored IP packet is generated by decompressing compressed data in a TLV packet whose context identifier is same as the context identifier of the input TLV packet determined to include the compressed IP packet.

9. The data decompression method according to claim 7, further comprising:

restoring a version of the input TLV packet in accordance with the determined context identification header type; and generating the restored IP packet in accordance with the input TLV packet determined to include the compressed IP packet, the source IP address acquired on the basis of the determined context identifier, the fixed header information, and the restored version.

10. The data decompression method according to claim 9, wherein the fixed header information comprises information excluding the version of the input TLV packet.

11. The data decompression method according to claim 9, wherein the version of the input TLV packet is restored by writing information regarding the version to a memory area corresponding to the context identifier included in the compressed IP packet when the determined context identification header type includes a UDP header.

12. The data decompression method according to claim 9, wherein the version of the input TLV packet is restored by reading information regarding the version from a memory area corresponding to the context identifier included in the compressed IP packet when the determined context identification header type includes no UDP header.

* * * * *